US007490072B1

(12) United States Patent
Cowan et al.

(10) Patent No.: US 7,490,072 B1
(45) Date of Patent: Feb. 10, 2009

(54) PROVIDING ACCESS CONTROLS (75) Inventors: S. Crispin Cowan, Portland, OR (US);
Seth R. Arnold, Portland, OR (US);
Steven M. Beattie, Portland, OR (US);
John R. Johansen, Portland, OR (US);
Jesse D. Michael, Portland, OR (US);
Anthony D. Jones, Portland, OR (US)

(73) Assignee: Novell, Inc., Provo, UT (US)

( * ) Notice: Subject to any disclaimer, the term of this patent is extended or adjusted under 35 U.S.C. 154(b) by 348 days.

(21) Appl. No.: 11/354,730

(22) Filed: Feb. 15, 2006

Related U.S. Application Data (60) Provisional application No. 60/653,809, filed on Feb. 16, 2005.

(51) Int. Cl.
*G06F 17/00* (2006.01)
*G06N 5/02* (2006.01)
(52) U.S. Cl. .............................. 706/47; 706/14; 706/25
(58) Field of Classification Search ................... 706/47, 706/14, 25; 726/23
See application file for complete search history.

(56) References Cited

U.S. PATENT DOCUMENTS

| | | | |
|---|---|---|---|
| 4,918,653 | A | 4/1990 | Johri et al. |
| 6,457,130 | B2 | 9/2002 | Hitz et al. |
| 6,799,208 | B1 * | 9/2004 | Sankaranarayan et al. .. 709/223 |
| 7,181,768 | B1 * | 2/2007 | Ghosh et al. .................. 726/23 |
| 2003/0115292 | A1 | 6/2003 | Griffin et al. |
| 2004/0025048 | A1 | 2/2004 | Porcari et al. |
| 2004/0049697 | A1 | 3/2004 | Ewards, Jr. et al. |
| 2005/0120054 | A1 * | 6/2005 | Shulman et al. .......... 707/104.1 |
| 2005/0246588 | A1 * | 11/2005 | Deng et al. .................... 714/38 |
| 2006/0047657 | A1 | 3/2006 | Frieder et al. |
| 2006/0123101 | A1 * | 6/2006 | Buccella et al. ............. 709/223 |
| 2006/0230124 | A1 | 10/2006 | Belfiore et al. |

OTHER PUBLICATIONS

Stephanie Forrest, Computer Immunnology, Oct. 1997, ACm, 88-96.*
Peter Aiken et al., Microsoft Computer Dictionary, 2002, Microsoft Press, Fifth Edition.*
Crispin Cowan, Seth Arnold, Steve Beattie, Chris Wright, Wirex and John Viega, Secure Software; *Immunix & Defcon: Defending Vulnerable Code From Intense Attack*; Apr. 23, 2003; IMMUNIX; USA.
Crispin Cowan, Steve Beattie, Greg Kroah-Hartman, Calton Pu, Perry Wagle, and Virgil Gligor—WireX Communications, Inc.; *SubDomain: Parsimonious Server Security*; Proceedings of the 14th Systems Administration Conference; Dec. 3-8, 2000; The USENIX Association, USA.
Crispin Cowan, Seth Arnold, Steve Beattie, and Chris Wright, Wirex Communications, Inc. & John Viega, Secure Software Inc.; *Defcon Capture the Flag: Defending Vulnerable Code from Intense Attack*; USA, no date.

(Continued)

*Primary Examiner*—Joseph P Hirl
(74) *Attorney, Agent, or Firm*—Marger Johnson & McCollom, P.C.

(57) ABSTRACT

Providing access control for an application is disclosed. An application is monitored. An application profile is generated for the application. The application profile is based at least in part on behavior of the application as observed through the monitoring of the application. The application profile defines one or more access controls associated with the application.

20 Claims, 6 Drawing Sheets

OTHER PUBLICATIONS

Tanenbaum, Andrew S., Modern Operating Systems; 2nd ed.; 2001; Prentice Hall, Upper Saddle River, NJ; pp. 753-757.

Forrest, Stephanie, et al., "Computer Immunology," vol. 40, No. 10, Oct. 1997, ACM, pp. 88-96.

Garfinkel, et al., Practical Unix & Internet Security, ISBN 1-56592-148-8, Chpt. 3.1, 3.2, 4.1, 4.2, Second Ed., Apr. 1996.

Tanenbaum, Andrew S., "Computer Networks," Prentice Hall 1996, Third Edition, pp. 29, 44.

Fusco, John, "The Linux Programmer's Toolbox," Chapter 5, "What Every Developer Should Know about the Kernel," pp. 222-224, Prentice Hall 2007.

Nemeth, Evi, et al., "Linux Administration Handbook," Chapter 12—TCP/IP Networking, pp. 276-277, Prentice Hall 2006.

Newham, Cameron and Rosenblatt, Bill, "Learning the bash Shell," 2nd Ed., O'Reilly & Associates, 1998, p. 13.

* cited by examiner

┌302
/usr/local/bin/shopping_cart {
        ⎧ /usr/local/ecommerce/prices.txt      ⎧ r,
        ⎪ /usr/local/ecommerce/tmp/*           ⎪ wl,
        ⎪ /usr/local/bin/refreshdb             ⎪ x,
    304 ⎨ /var/lib/*                           ⎨ rx
        ⎪ /bin/mail                        306 ⎪ x      + {/var/mail/*   w},
        ⎪ /usr/bin/credit_card_processing      ⎪ x      - {/bin/mail     x},
        ⎩ /usr/bin/audit                       ⎩ x {
                                                           /var/log/*  r, ⎫
                                                           ...             ⎬ 308
                                                        },                 ⎭
}
```

Fig. 3

402 - % genprof /usr/local/bin/shopping_cart

404 - Please start the application to be profiled in another window and exercise its functionality now.  Once completed, select (U)pdate to continue, or (F)inish to exit.

Profiling: /usr/local/bin/shopping_cart
Reading log entries from: /var/log/messages 406 — [(P)arse log] / 408 — (F)inish
Updating profiles in /etc/subdomain.d/

410 ————————————————————————————————————————————————————————————————

412 — Read: /dev/random
       [1 - /dev/random] — 414

416 — [(A)llow] / (D)eny / (N)ew / (G)lob / GlobWith(E)xt / Abo(r)t / (F)inish

418 — Execute: /www/cgi-bin/cart_helper
       [(I)nherit] / (P)rofile / (U)nconfined / (D)eny / Abo(r)t / (F)inish 420 — Read: /usr/local/ecommerce/data/prices.dat
         1 - /usr/local/ecommerce/data/prices.dat
         2 - /usr/local/ecommerce/data/*
       [3 - /usr/local/ecommerce/**]
       [(A)llow] / (D)eny / (N)ew / (G)lob / GlobWith(E)xt / Abo(r)t / (F)inish 422 — Read: /usr/lib/perl5/5.8.6/AutoLoader.pm
       424 — 1 - #include <abstractions/perl>
       426 — 2 - /usr/lib/perl5/5.8.6/AutoLoader.pm
       [(A)llow] / (D)eny / (N)ew / (G)lob / GlobWith(E)xt / Abo(r)t / (F)inish 428 — Read: /usr/local/ecommerce/data/inventory.dat
         1 - /usr/local/ecommerce/data/inventory.dat
         2 - /usr/local/ecommerce/data/*
       [3 - /usr/local/ecommerce/**]
       [(A)llow] / (D)eny / (N)ew / (G)lob / GlobWith(E)xt / Abo(r)t / (F)inish 430 — Read: /usr/lib/libguilereadline.so.12
         1 - /usr/lib/libguilereadline.so.12
       432 — 2 - /usr/lib/usr/lib/libguilereadline.so.*
       434 — [3 - /usr/lib/libguile*so*]
       [(A)llow] / (D)eny / (N)ew / (G)lob / GlobWith(E)xt / Abo(r)t / (F)inish

Fig. 4

```
                        ┌─ 502
    /usr/sbin/ntpd {
504 ─ #include <abstractions/base>
506 ─ #include <abstractions/nameservice>
508 ─ #include <program-chunks/ntpd>
        ┌ capability ipc_lock, ─ 512
        │ capability net_bind_service, ─ 514
        │ capability sys_time, ─ 516
  510 ─┤  capability sys_chroot,
        └ capability setuid,
        /etc/ntp.conf              r,
        /etc/ntp/drift*      rwl,
        /etc/ntp/keys              r,
        /etc/ntp/step-tickers      r,
        /tmp/ntp*            rwl,
        /usr/sbin/ntpd       rix,
        /var/log/ntp         w,
        /var/log/ntp.log     w,
        /var/run/ntpd.pid    w,
        /var/lib/ntp/drift          rwl,
        /var/lib/ntp/drift.TEMP     rwl,
        /var/lib/ntp/var/run/ntp/ntpd.pid w,
        /var/lib/ntp/drift/ntp.drift        r,
        /drift/ntp.drift.TEMP       rwl,
        /drift/ntp.drift            rwl,
    }
```

Fig. 5

```
    /usr/sbin/sshd {  602
    ...
    ^EXEC {
604     #include <program-chunks/base-files>
        #include <program-chunks/shells>

/bin/ash ux,
        /bin/bash ux,
        /bin/bash2 ux,
        /bin/bsh ux,
        /bin/csh ux,
        /bin/ksh ux,
        /bin/sh ux,
        /bin/tcsh ux,
        /bin/zsh ux,
        /sbin/nologin ux,
    }

606 ^PRIVSEP {
        #include <program-chunks/base-files>
        #include <program-chunks/nameservice-files> capability sys_chroot,
        capability setuid,
        capability setgid,
        ...
    }
```

Fig. 6

PROVIDING ACCESS CONTROLS

CROSS REFERENCE TO OTHER APPLICATIONS

This application claims priority to U.S. Provisional Patent Application No. 60/653,809 entitled Enterprise-Wide Access Control Systems filed Feb. 16, 2005 which is incorporated herein by reference for all purposes.

BACKGROUND OF THE INVENTION

One typical way of securing a computer system is to limit the ability of an adversary to use an application in an unapproved manner. Traditionally, this is accomplished by closing unnecessary ports, limiting access to open ports, minimizing the number of installed applications, and so on. In each case, considerable manual effort is required on the part of an administrator, who is often faced with the cumbersome process. Additionally, the security of the resulting system often comes at a cost of reduced convenience to authorized users of the system. Erring on the side of caution can result in a system on which essential software may be rendered unusable. Conversely, failing to recognize and mitigate vulnerable applications can quickly result in a compromised system. Compounding the problem, existing solutions typically require that a security policy be applied to an entire system, preventing the exclusion of portions of the system from the policy, and also precluding an incremental approach.

Therefore, it would be desirable to have a better way to secure a computer system.

BRIEF DESCRIPTION OF THE DRAWINGS

Various embodiments of the invention are disclosed in the following detailed description and the accompanying drawings.

FIG. 4 illustrates an example interaction with a dynamic analyzer.

DETAILED DESCRIPTION

The invention can be implemented in numerous ways, including as a process, an apparatus, a system, a composition of matter, a computer readable medium such as a computer readable storage medium. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing access control for an application is disclosed. An application is selected for access control. In some embodiments, an initial profile of normal and expected application behavior, e.g., which files and/or other objects and resources the application is expected to create and/or use, is generated through static analysis of application code. The initial profile is refined by performing dynamic analysis of the actual behavior of the application while it is running. In some embodiments, the dynamic analysis includes refining the initial profile through a series of interactive questions generated based at least in part on observed behavior of the application.

Figure 1:
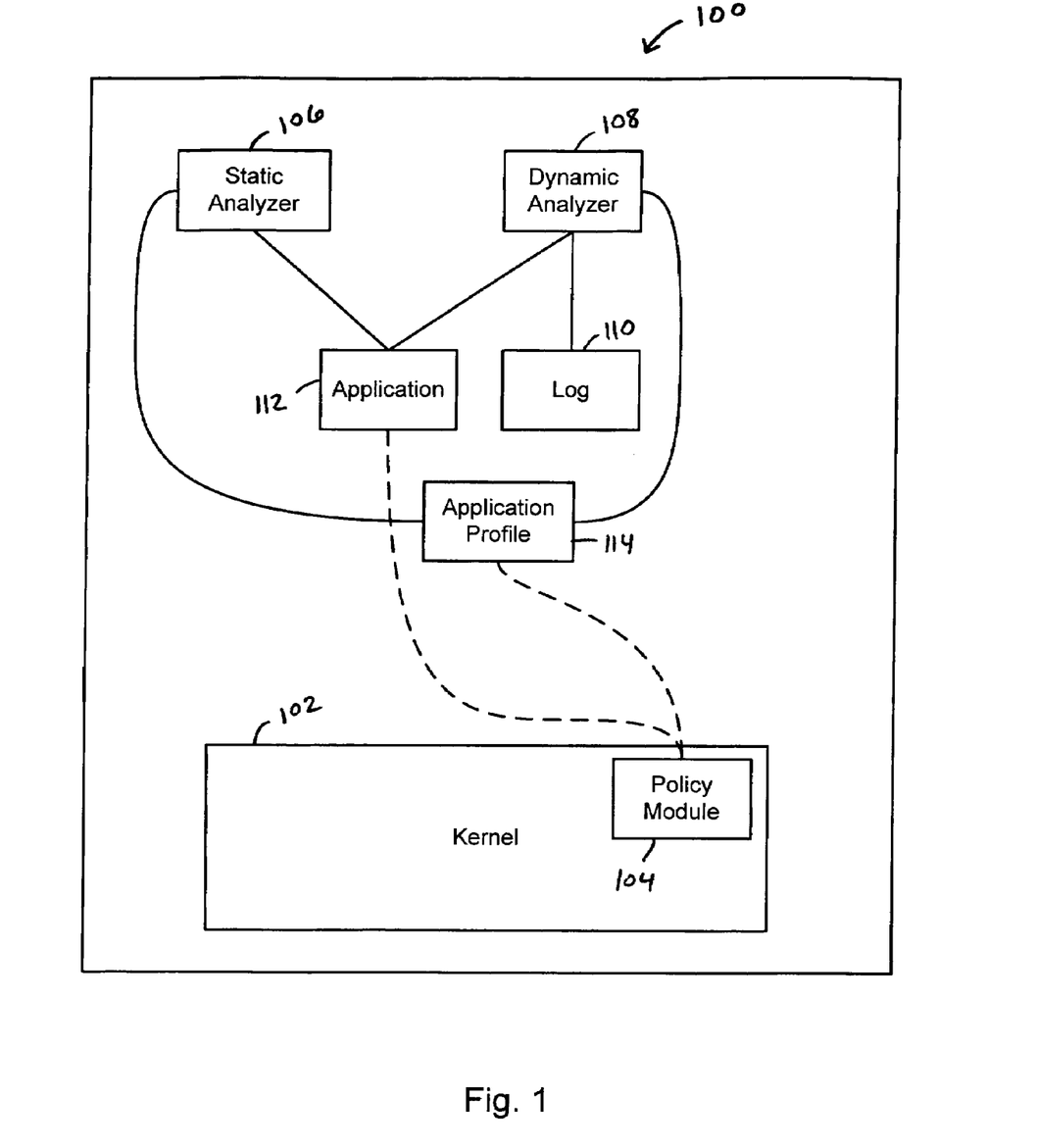
FIG. 1 is a block diagram illustrating an embodiment of a system having access controls.

FIG. 1 is a block diagram illustrating an embodiment of a system having access controls. In the example shown, a kernel 102, a policy module 104, a static analyzer 106, a dynamic analyzer 108, a log 110, an application 112, and an application profile 114 are included. In this example, system 100 is a SUSE Linux system. Other platforms, such as MICROSOFT WINDOWS may also be used, and the techniques described herein may be adapted as appropriate. Similarly, in this example, policy module 104 is a Linux loadable kernel module. Policy module 104 may be adapted for other architectures as appropriate.

In this example, an application 112 is selected for protection and profiled by static analyzer 106 to create application profile 114. In some embodiments, all applications are profiled. In system 100, applications that mediate privilege are profiled. These can include: network agents (e.g., programs that respond to network ports), network/web applications (CGI PERL scripts, PHP pages, etc.), scripting languages (e.g., Python), setuid/guid programs (programs that run as the user/group that owns the program file rather than as the user/group that invokes the program), and cron jobs (many of which run with root privilege). In other cases, applications to be profiled may be selected by other criteria, such as the userID associated with the application, or applications owned by root. In some embodiments, the static analysis performed by static analyzer 106 includes static analysis of all or part of the application code associated with application 112, e.g., to determine information such as the names, paths, directories, etc. of files created and/or used by the application; the nature, types, and/or other identifying information of processes spawned and/or called by the application during normal operation; etc.

Application profile 114 is refined in some embodiments by running application 112 and logging the access requests that it makes in a log 110. For example, attempts at reading libraries and writing to particular directories are recorded in log 110. Dynamic analyzer 108 evaluates log 110 and interacts with an administrator to determine an appropriate set of rules to cover the logged behavior. In some embodiments, events that do not comport with application profile 114 as it exists at the time of the event are logged in log 110 and analyzed dynamically at least in part by dynamic analyzer 108. In some embodiments, as the application profile 114 is refined, events that would have departed from the initial profile but satisfy the refined profile are ignored (i.e., not logged and/or not analyzed) by dynamic analyzer 108.

A policy module 104 loaded in kernel 102 is configured to enforce the access controls specified in application profile 114 against application 112. The restrictions listed in the application profile (also referred to herein as a "policy") typically complement any access controls already provided by the underlying system, also known as native access controls. Thus, for example, any file access must be allowed under both the native access controls, and any controls provided in the application profile for access to be granted to application 112. When an application having an application profile is executed, it is referred to herein as a "confined process."

A user-level parser (not depicted) reads profiles such as profile 114 from a specified location, such as /etc/subdomain.d/* and converts the textual representation of profiles into kernel data structures. The parser inserts the profiles into kernel 102 such as by using a sysctl( ) interface.

Relevant system calls (e.g., open, exec, read) are modified to check if the calling process is confined. If so, the request is referred to the policy module for further inspection. When a confined process makes a request that is permitted, the policy module returns normally. When a confined process attempts to perform a file operation that is not permitted, a syscall returns with a permission error. In some embodiments, kernel 102 also generates a syslog entry describing the attempted access violation. This information can be used by a variety of other security features, such as an intrusion detection system, as appropriate.

While applications may typically be programs, the techniques described herein can be used to confine arbitrary software components. Thus, as used herein, applications can also include component-based services, loadable modules, sub process modules, etc.

Figure 2:
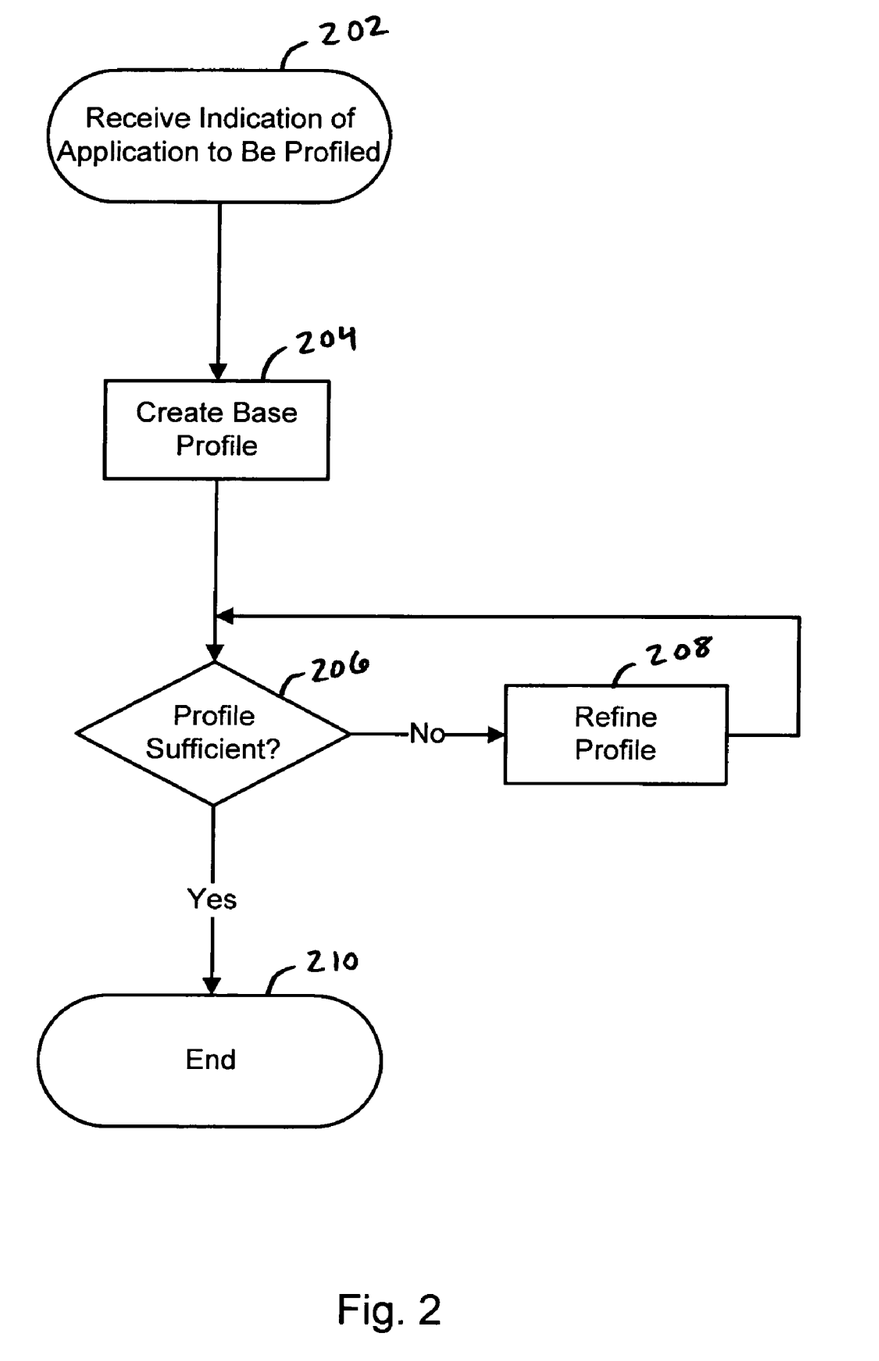
FIG. 2 is a flow chart illustrating an embodiment of a process for creating an application profile.

FIG. 2 is a flow chart illustrating an embodiment of a process for creating an application profile. The process begins at 202 when an indication that an application is to be profiled is received. In some embodiments, this is accomplished by an administrator entering a command such as "generate-profile <path to application>". For example, an administrator could begin at 202 by entering a command such as "generate-profile /usr/sbin/apache" in a console window, to indicate that the "apache" application is to be profiled. In other embodiments, other interfaces, such as the YaST graphical user interface are used in lieu of or in addition to the console, as appropriate.

In some embodiments, an automated method is used to help determine which applications should be profiled. For example, a suggested list of network agents to be profiled can be presented to an administrator by scanning for and inspecting open ports. This can be done from within system 100 through use of a command such as netstat, or from outside system 100 with a port scanner. Similarly, unconfined setuid/guid programs, etc., can be located and presented to the administrator with a suggestion that they be profiled.

At 204, a base profile (also referred to as an "initial profile") is created. In some embodiments, the application is scanned and an initial estimate of the program's profile is produced. One way of accomplishing this is through a static analysis tool, such as static analyzer 106. For example, the "ldd" program can be used to detect the set of dynamic libraries that a program will need to access. Base profiles can also take into account the type of executable (e.g., elf binary, #! script, etc.). For example, in addition to receiving access to the libraries identified by ldd, a Perl script may also get blanket access to Perl-specific resources. In some embodiments, other methods of static analysis are used, such as looking for calls to open. In some embodiments, the base profile is created at 204 as an empty file and all of the contents of the profile are generated at 208.

At 206, it is determined whether application profile 114 is sufficient. In some embodiments, the profile is determined at 206 to be sufficient if the application profile permits most to all of the activities that application 112 is legitimately supposed to perform. As described in more detail below, one way of verifying whether a profile is sufficient is to run application 112 and confirm that log 110 is free of access violations attributable to application 112.

For all but the most simplistic programs, the base profile created at 204 will too narrowly confine application 112. One reason for this is that programs typically need access to a variety of resources beyond dynamic libraries.

Thus, in most cases, at 208, the profile is refined. As described in greater detail below, one way of accomplishing this is to enter a learning mode in which file accesses that the application attempts are logged, but not enforced. In some embodiments, where possible, events are generalized, e.g., through interacting with an administrator, to refine the profile, e.g., by defining and/or modifying a (generalized, if possible) rule such that the observed access attempt would in the future be permitted under the profile. For example, in some embodiments for each event, where possible one or more generalizations of the event are suggested, offering the administrator the opportunity to choose to define a narrow rule that would permit the specific access attempt observed or a more general rule that would allow access to resources of a general class of which the specifically accessed resource is a member, e.g., by allowing access to all files in a particular library, as opposed to allowing access just to the specific file the application was observed to access.

The process ends at 210 when it is determined that application profile 114 is sufficient. In this case, a profile has been created that satisfies all of the logged events. In some embodiments, the process of FIG. 2 is run periodically to further refine the profile. In some embodiments, the process of FIG. 2 is run continuously and an administrator periodically is prompted to further refine the profile based on observed events, e.g., access attempts, that violate the profile.

Figure 3:
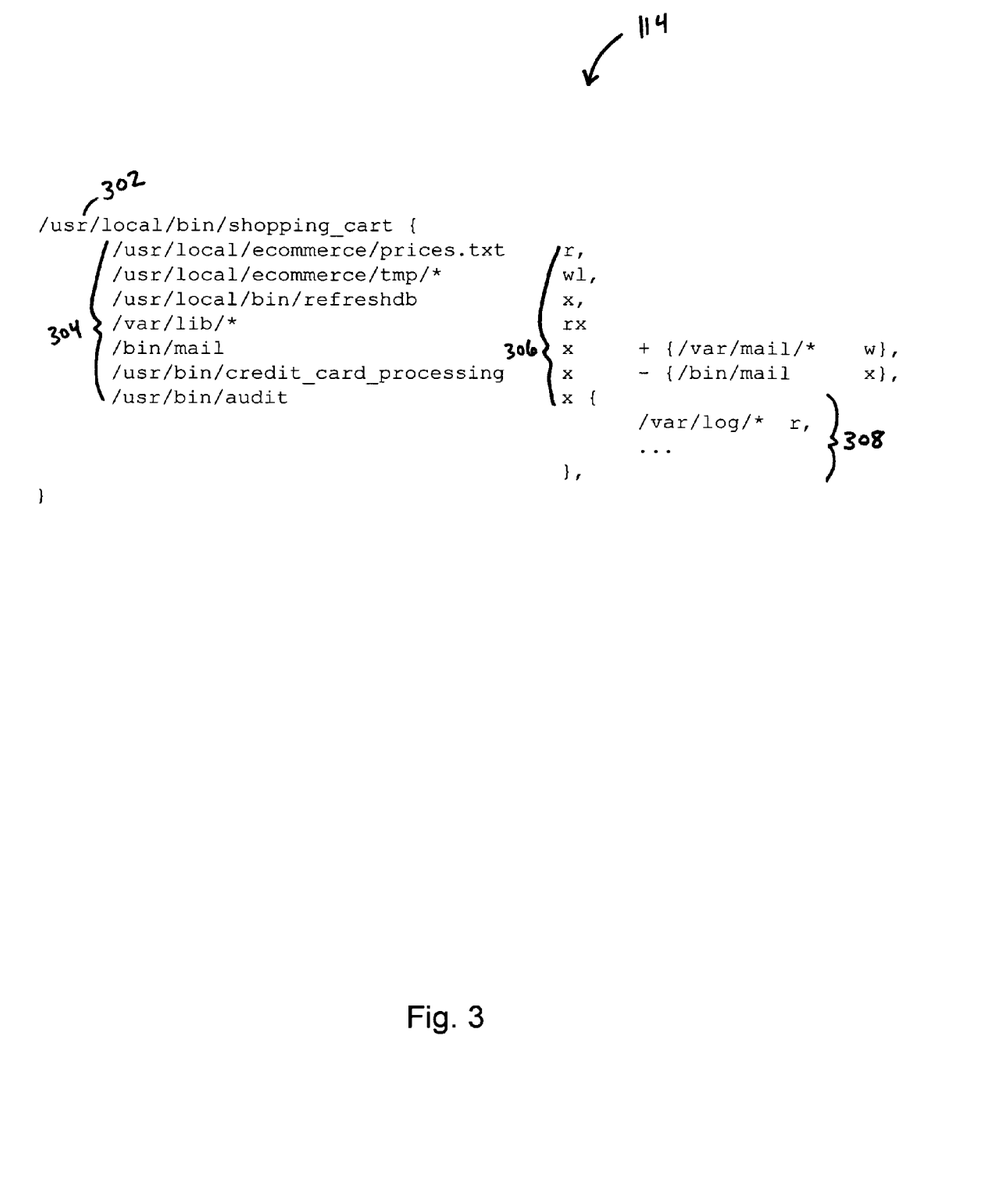
FIG. 3 illustrates an embodiment of an application profile.

FIG. 3 illustrates an embodiment of an application profile. Application profile 114 includes information such as a list of files that the profiled application 112 may access (304), and the corresponding operations the application may perform (306) on those files. The access controls granted to a particular application are sometimes referred to collectively as the "domain" of activities that application is authorized to perform.

In this example, the application being profiled is a shopping cart program called "shopping_cart" (302). The shopping_cart application has been given read access to /usr/local/ecommerce/prices.txt, write and link (and unlink) access to all files in the directory /usr/local/ecommerce/tmp, execute access to the application /usr/local/bin/refreshdb, and read and execute access to all files in the directory /var/lib. It may also execute the programs "mail," "credit_card_processing," and "audit." In some embodiments, capabilities such as the POSIX.1e draft capabilities are optionally included.

Whenever shopping_cart is run, by any user, it is restricted to accessing the above files with the above listed modes. When an application is granted execute access, a variety of methods can be used to address what restrictions should apply to the resulting child process. In this example, the default behavior is that the child process inherits the parent process's application profile. This generally prevents the confined application from "escaping" its access controls by executing an unrestricted child process, and is denoted herein as mode "ix." In some cases, however, the sub-components of an application may require different access to different resources than the application as a whole.

For example, a mail delivery agent may need special permissions to write to a user's mail box. One way of accomplishing this is to specify the child's constraints as slight modifications to the parent's profile by including additional information in the parent's application profile. Here, this is denoted by including a "+" or a "−" and an additional specification. As described in more detail below, other denotations may be used as applicable.

In this example, whenever application 114 calls the program, /bin/mail, in addition to having access to all of the resources that the application has access to, it is also granted write access to all files in the directory /var/mail. And, when application 114 calls the program, /usr/bin/credit_card_processing, that child process may not access /bin/mail but is otherwise entitled to the same resources that application 114 is.

In some cases, a child process may have a profile that is completely unrelated to the parent's profile. For example, a logging routine may invoke a specialized agent. Here, this is denoted by including an additional specification, without a "+" or "−".

In this example, whenever application 114 calls the program /usr/bin/audit, instead of inheriting access to resources from the application, an entirely different set of access controls will be used, as specified within portion 308.

Other methods of determining what access to grant child processes can be used as appropriate. For example, in some embodiments, if a child has its own profile, a designation of "px" in the parent profile requires that the child's profile be used when the child is spawned. If "px" is required, but the child does not have a profile, the child is blocked from executing. In other embodiments, a child may run unconfined (denoted "ux"), or may inherit a profile specified by name or file location (denoted "@x").

FIG. 4 illustrates an example interaction with a dynamic analyzer. At 402, an administrator indicates that the application "/usr/local/bin/shopping_cart" should be profiled. This corresponds with portion 202 of FIG. 2. In this example, the base profile is created (204) as an empty file, without any initial static analysis.

At 404, the administrator is invited to run the shopping_cart application. The administrator exercises the functionality of shopping_cart in a learning mode, where violations of the profile are logged in a log 110, such as /var/log/messages. These logged events generally represent the proper behavior of the application being profiled. In some embodiments, time markers, hashes, or other hints may be inserted into the log and checked for by the dynamic analyzer. These may be used, for example, to help the analyzer follow the execution of the application better, including by creating a tree of events, and other program executions, to create an impression of interactive behavior while profiling.

In some cases, the application may be run through a comprehensive test suite or quality assurance (QA) cycle to best reflect how the application will be used in a production environment. If an administrator forgets to exercise key functionality, or new features are added to an application after it has been profiled, the profile can be updated by repeating portion 208 of FIG. 2.

In some embodiments, profile generation is decoupled from QA testing. For example, for large applications with large QA suites, the administrator can send the application and a set of profiles to the QA department for testing in learning mode. The log files can then be collected at the end of the QA test and sent back to the administrator or other entity, such as a security profile developer. The profile refinement process can thus be conducted offline from the program being tested, allowing the profiles for the programs to be improved without the administrator having direct access to the QA test machines or the test suite.

When the administrator is finished executing the application to be profiled, at 406, the administrator selects an option to parse the log for events. In this example, a default recommended option is enclosed in brackets and will be selected if the administrator hits a default key, such as the Enter key. Other choices may be selected by pressing the appropriate key, such as "F" (408) to end the dynamic analyzer. In other embodiments, other interfaces may be used as appropriate.

The administrator is now posed a series of questions that correspond to events logged in log 110 while application 112 was executing in learn mode (410). This corresponds with portion 208 of FIG. 2. Some of the specific questions and simplifications described below are applicable only to a SUSE Linux platform. Other questions and simplifications can be used with other platforms as applicable.

At 412, an event in the log indicates that shopping_cart read /dev/random. The administrator is presented with several options to incorporate this into the shopping_cart profile. First, the administrator selects a directory path (414), then the administrator selects a rule (416). In this example, the resource is /dev/random, and the application requires read access to that resource. While only one directory path is presented here, several rules are presented. In this example, rules include the following: "Allow" grants the program access to the specified resource. "Deny" prevents the program from accessing the specified directory path entry. "Glob" modifies the directory path, for example by using wild cards to include all files in a directory, or other regular expressions (e.g., character alteration, arbitrary numbers of path elements, etc.) as desired. "Glob with extension" wildcards the filename in a path, while retaining the file extension. "New" allows the administrator to manually create a rule. "Abort" ends the dynamic analyzer, discarding changes. "Finish" closes the dynamic analyzer, saving any changes made to the profile.

At 418, an event in the log indicates that shopping_cart spawned the helper application /www/cgi-bin/cart_helper. The administrator is prompted to determine which type of inheritance (in this example, ix, px, or ux) should be used. In some embodiments, when a child process is encountered, the dynamic analyzer automatically causes a profile to be generated for the child if one does not exist.

At 420, an event in the log indicates that shopping_cart read /usr/local/ecommerce/data/prices.dat. The administrator is presented with several directory path choices. The first corresponds to the literal, full path of the accessed file. The second corresponds to the /data/ subdirectory. The third corresponds to the entire /ecommerce/ subdirectory, and all sub-sub directories and files it might contain. The third has been selected as the default.

"#include" is a directive that can be used to simplify a profile by either abstracting common tasks, or using chunks of other programs. In some embodiments, abstractions include access to authentication mechanisms, access to name service routines (e.g., DNS lookups, userid lookups), graphics requirements, and system accounting. The administrator can also define abstractions to be used by the dynamic analyzer.

In the example shown, at 422, an event in the log indicates that shopping_cart read the Perl module, AutoLoader.pm.

The administrator is presented with the choice of including an abstraction for the Perl programming language (424), and just read access to the specific AutoLoader.pm module (426).

Program chunks can be used to allow local policies to be created while leaving the underlying application profiles standardized across multiple servers. Other frameworks can also be used so that an administrator can easily add site-specific glob suggestions and site-specific include files that will be suggested if they match access requests.

At 428, an event in the log indicates that shopping_cart read a data file, /usr/local/ecommerce/data/inventory.dat. To allow read access to all .dat files in the /data/ directory, the administrator could select GlobWithExt. To specify a new rule, such as one permitting read access to all files on the server named inventory.*, the administrator could select New and enter the desired rule.

At 430, an event in the log indicates that shopping_cart read a library, /usr/lib/libguilereadline.so.12. The administrator's choices for permitting access to the library include generalizations that help maintain compatibility when future versions of the library are installed (432), and access to other libraries in the libguile family (434). Other globs can be suggested for aspects such as kernel module version numbers, process IDs (e.g., /proc/<pid>/output may be rewritten as /proc/*/output), usernames (for example, when paths look like user directories), locale files, temporary files (the names of which may change at least in part on each execution by design), time zone files, system fonts (and other directories which contain content for which when a single file is requested, access to the entire directory should be suggested, such as /etc/profile.d and /etc/sysconfig/powersave/), etc.

In some embodiments, generalizations are presented based at least in part on patterns of file accesses. This may be independent of any knowledge of the layout of the operating system's file system. For example, the profile generator can be configured to notice repeated file access requests that are very similar (e.g. similar file names, extensions, paths, etc.), and suggest generalizations of these requests so that a single globbed rule captures several requests. One way of doing this is to sort file access requests into alphabetical order, then compute the regular expression distance between adjacent requests and generate a glob that matches pairs of adjacent lines. In some embodiments, this process is repeated recursively to generate a list of globbed suggestions that capture a potentially large number of access requests with a small number of globbed rules.

In some embodiments, the list of generalizations that can/will be presented are stored in a single place, such as a file called logprof.conf, which can be readily modified by an administrator or user as applicable. In this example file, patterns and responses can be encoded so that when the dynamic profile generator sees a file access of "pattern," it will suggest a generalization of "response." The "response" can include such things as a glob generalization, a kind of execute permission to suggest (e.g., px, ix, or ux), or a directive not to profile a particular application.

The following are additional examples of simplifications (not pictured) that are presented to the administrator in various embodiments:

Different access requests for the same path can be collapsed into a single question. For example, if the program first reads from file.txt, and then later tries to write to file.txt, the administrator will be presented with a singe question about access, rather than two separate questions.

When saving the completed profile, the profile entries can be sorted alphabetically, as can the access mode pieces for each element.

When events are satisfied by existing profile elements, they are not presented to the administrator, whether they were in the profile at the beginning of the session, or whether they were recently added.

When an administrator adds a rule that is a superset of one or more previous entries, the subsumed rules are removed from the profile. For example, adding "/tmp/** rwl", which in some embodiments would grant read, write, and link privileges with respect to any file in the /tmp/ directory or any of its subdirectories, would remove an existing rule for "/tmp/October/sales.txt w", which only granted write privileges to the single file "sales.txt" in the "October" subdirectory in the "tmp" directory.

Additional examples of simplifications involving inheritance (not pictured) include:

Allowing the administrator to customize mandatory inheritance modes (ix/px/ux) that a specific application must be started with. For example, an administrator can specify that /bin/bash should never have its own profile, and that when a profile is created for an application calling /bin/bash, it may only be called with ix or ux.

When a confined process executes a child, the administrator can be prompted to decide whether the child's actions should be attributed to the parent, to the child, both, or another profile.

To prevent a child process from logging itself as an event, read access can be added at the same time its profile is created.

Determining whether an execute access causes a domain transition, such as an exec( ) call, or something like mmap-with-execute-permission/initial-1d.so-loader.

Figure 5:
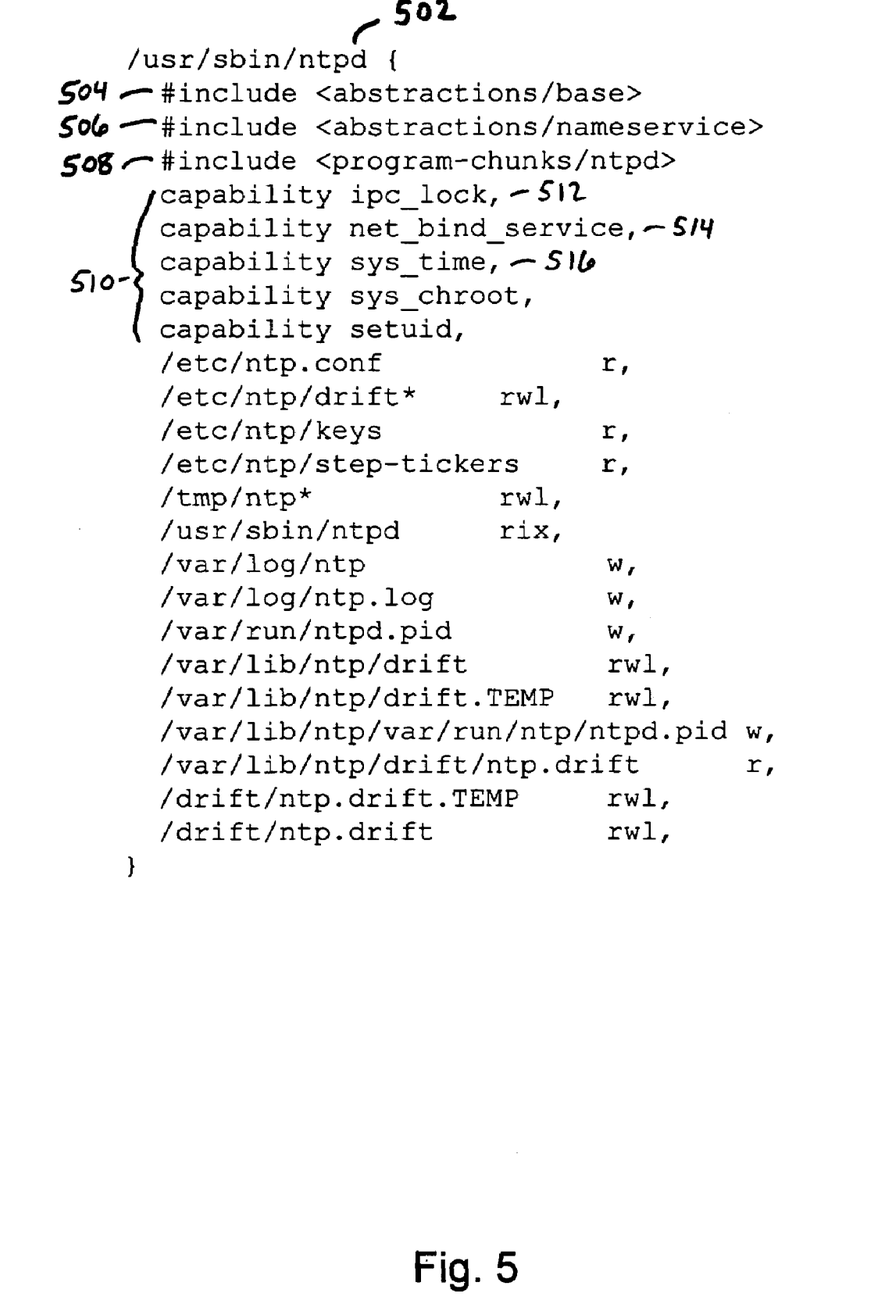
FIG. 5 illustrates an embodiment of an application profile.

FIG. 5 illustrates an embodiment of an application profile. In this example, the application being profiled is the network time protocol daemon, or "ntpd" (502). The application profile has three #includes. The first (504), "abstractions/base" is a set of file access permissions that are needed by many programs, such as read permission for glibc. The second (506), "abstractions/nameservice" includes accesses required to do user name lookups, DNS lookups, etc. The third (508), "program-chunks/ntpd" is a program-chunk. In this example, a program-chunk is a way of prepackaging most of the accesses required for a given program, so that if an administrator wants to profile NTPD, one suggestion that the analyzer could make would be "#include <program-chunks/ntpd>", meaning that the user would only need to add rules for local configurations.

The application profile in this example also includes several capabilities (510). In some embodiments, these are the POSIX.1e draft capabilities. For example, the capability ipc_lock (512) permits the process to lock blocks of memory in core. The capability net_bind_service (514) permits binding to privileged low-numbered ports. The capability sys_time (516) permits modification of the system clock, etc.

In some embodiments, access controls are provided at the granularity of a single native process. In some embodiments, sub-process confinement is achieved by using an API called change_hat( ). A confined process can call change_hat( ) to change its confinement to a sub-profile also referred to herein as a "hat."

In an application server platform, such as an Apache web server (with built-in execution environments such as mod_perl or mod_php, supporting the PERL and PHP programming languages, respectively), efficient execution of active server pages scripted in PERL, PHP, etc., can come at the expense of security because they all execute in a single process and in a single security domain. By using change_hat( ), each individual script can be executed in a security domain designed just for that script.

Figure 6:
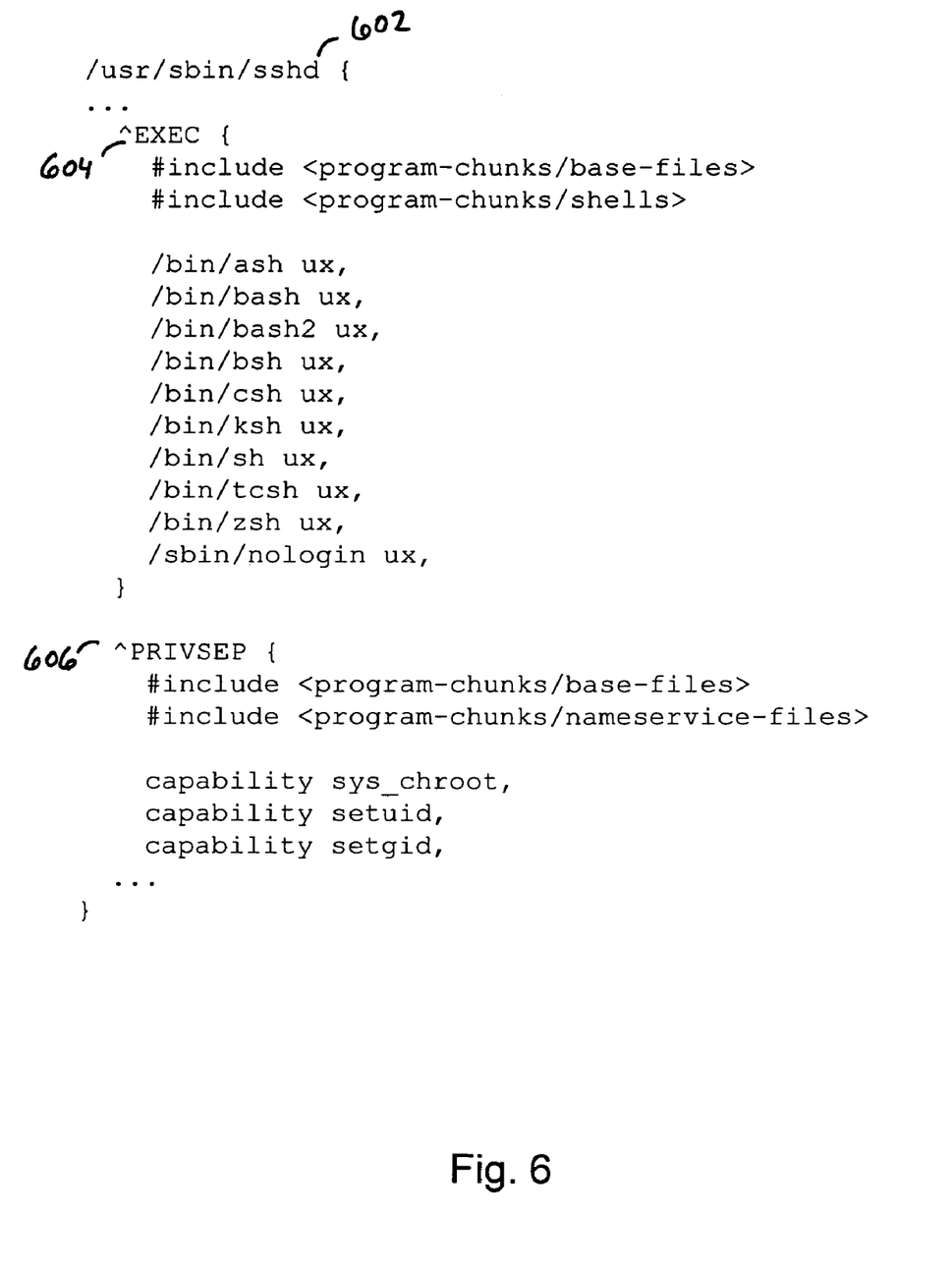
FIG. 6 illustrates a portion of an embodiment of an application profile.

FIG. 6 illustrates a portion of an embodiment of an application profile. In this example, the application being profiled is the secure shell daemon, or "sshd" (602) and makes use of change_hat( ).

The EXEC hat (604) is the default subprofile, used when sshd has authenticated the user. The PRIVSEP hat (606) is a subprofile for handling network input. It is a privilege separated child, in that it has fewer privileges than the EXEC subprofile, so that attacks from unauthenticated users are more tightly confined. Other subprofiles also used, but not pictured, include a subprofile that handles authentication requests from the privilege separated child, and a subprofile for the post-authentication period that is used until the user's shell is spawned.

One way of creating a sub-profile is for the dynamic profile builder to suggest creating a hat for each unique web URL access request. Default hats can be suggested for use in assorted default circumstances, to help minimize the amount of interaction required from the user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing access control for an application comprising:
   monitoring the application;
   generating for the application, based at least in part on behavior of the application as observed through said monitoring of the application, and based at least in part on an input a user is prompted to provide, an application profile that defines one or more access controls associated with the application; and
   storing the access controls in a policy module configured to enforce the access controls specified in the application profile against the application.

2. The method of claim 1 wherein generating an application profile includes:
   automatically generating an initial version of an application profile; and
   refining the application profile at least in part by monitoring the application.

3. The method of claim 2 wherein the initial version of the application profile is generated based at least in part on a static analysis of code associated with the application.

4. The method of claim 1 wherein the application profile is refined based at least in part on a log.

5. The method of claim 4 wherein the log is created non-contemporaneously with the refining of the application profile.

6. The method of claim 4 wherein the log is created on a first platform and the application profile is refined on a second platform.

7. The method of claim 1 wherein the application profile uses shell globbing syntax.

8. The method of claim 1 wherein prompting the user includes providing questions to the user.

9. The method of claim 1 wherein prompting the user includes not providing to the user, based at least in part on the user's response to a first question, a second question that would otherwise have been provided to the user based on an observed behavior of the application.

10. The method of claim 1 further including refining the generated profile at least in part by suggesting one or more generalizations of one or more access controls.

11. The method of claim 10 wherein which generalization to suggest is determined based at least in part on the similarity of a plurality of access requests.

12. The method of claim 1 further including refining the generated profile at least in part by automatically deleting from the profile access controls that are subsumed by other access controls.

13. A system of providing access control for an application comprising:
   a processor, coupled to a memory, configured to:
      monitor the application; and
      generate for the application, based at least in part on behavior of the application as observed through said monitoring of the application, an application profile that defines one or more access controls associated with the application; and
   a memory, coupled to the processor configured to store the application profile.

14. The system of claim 13 wherein the processor further includes means for generating the application profile by:
   automatically generating an initial version of an application profile; and
   refining the application profile at least in part by monitoring the application.

15. The system of claim 14 wherein the processor further includes means for generating the initial version of the application profile based at least in part on a static analysis of code associated with the application.

16. The system of claim 13 wherein the processor is on a first platform and further includes means for refining the application profile based at least in part on a log provided by a second platform.

17. The system of claim 13 including a policy module configured to enforce access controls defined by the application profile.

18. A computer program product for providing access control for an application, the computer program product being stored in a computer readable medium and comprising computer instructions for:
   monitoring the application;
   generating for the application, based at least in part on behavior of the application as observed through said monitoring of the application, an application profile that defines one or more access controls associated with the application; and
   storing the access controls in a policy module configured to enforce the access controls specified in the application profile against the application.

19. A computer program product as recited in claim 18, the computer program product further comprising computer instructions for:
   automatically generating an initial version of an application profile; and
   refining the application profile at least in part by monitoring the application.

20. A computer program product as recited in claim 19 wherein the initial version of the application profile is generated based at least in part on a static analysis of code associated with the application.

* * * * *

UNITED STATES PATENT AND TRADEMARK OFFICE
CERTIFICATE OF CORRECTION

PATENT NO. : 7,490,072 B1 Page 1 of 1
APPLICATION NO. : 11/354730
DATED : February 10, 2009
INVENTOR(S) : S. Crispin Cowan et al.

It is certified that error appears in the above-identified patent and that said Letters Patent is hereby corrected as shown below:

Title page:
(56) References Cited - U.S. Patent Documents
change "2004/0049697 A1 3/2004 Ewards, Jr et al." to --2004/0049697 A1 3/2004 Edwards, Jr et al.--

Column 6, line 58:
change "#include" to --A "#include"--

Column 9, line 26:
change "1. A method" to --1. A computer implemented method--

Column 9, line 35; Column 10, line 13, line 20, line 37, line 49, in each instance delete "configured"

Signed and Sealed this

Twelfth Day of May, 2009

JOHN DOLL
*Acting Director of the United States Patent and Trademark Office*